(12) United States Patent
Wang et al.

(10) Patent No.: US 10,060,789 B2
(45) Date of Patent: Aug. 28, 2018

(54) ELECTRONIC DEVICE WITH HIGH ELECTROSTATIC PROTECTION

(71) Applicant: PIXART IMAGING INC., Hsin-Chu County (TW)

(72) Inventors: Tsung-Fa Wang, Hsin-Chu County (TW); Yen-Min Chang, Hsin-Chu County (TW); Ching-Lin Chung, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 392 days.

(21) Appl. No.: 14/580,560

(22) Filed: Dec. 23, 2014

(65) Prior Publication Data
US 2015/0276472 A1    Oct. 1, 2015

(30) Foreign Application Priority Data

Apr. 1, 2014    (TW) .............................. 103112243 A (51) Int. Cl.
*G01J 1/02*    (2006.01)
*G06F 3/03*    (2006.01)
*G01J 1/42*    (2006.01)

(52) U.S. Cl.
CPC ........... *G01J 1/0271* (2013.01); *G01J 1/0233* (2013.01); *G06F 3/0317* (2013.01); *G01J 1/4228* (2013.01); *G01J 2001/0276* (2013.01)

(58) Field of Classification Search
CPC ...... G01J 1/0271; G01J 1/0233; G01J 1/4228; G01J 2001/0276; G06F 3/033; G06F 3/0354; G06F 3/03541; G06F 3/03543; G06F 3/0317
See application file for complete search history.

(56) References Cited

U.S. PATENT DOCUMENTS

| | | | |
|---|---|---|---|
| 6,051,848 A * | 4/2000 | Webb | H01L 31/0203 257/100 |
| 6,492,187 B1 * | 12/2002 | Farnworth | G01R 31/2851 257/48 |
| 6,933,584 B2 * | 8/2005 | Miyazaki | H01L 27/14618 257/432 |
| 6,967,321 B2 * | 11/2005 | Leong | G06F 3/0317 250/239 |
| 7,050,043 B2 * | 5/2006 | Huang | G06F 3/03545 345/166 |

(Continued)

FOREIGN PATENT DOCUMENTS

| | | |
|---|---|---|
| TW | I231605 | 4/2005 |
| TW | I344200 | 6/2011 |

*Primary Examiner* — John Lee
(74) *Attorney, Agent, or Firm* — Hauptman Ham, LLP (57) ABSTRACT

An electronic device including a substrate and an optoelectronic device package is provided. The optoelectronic device package includes a light source, an image sensor and a plurality of connecting pins. The light source is configured to emit light toward a direction of a bottom surface of the optoelectronic device package. The image sensor is configured to receive reflected light from the direction of the bottom surface. The connecting pins are bended toward an opposite direction of the direction of the bottom surface and electrically connected to the substrate thereby increasing a discharge path of the electrostatic discharge.

20 Claims, 6 Drawing Sheets

(56) References Cited

U.S. PATENT DOCUMENTS

| | | | | |
|---|---|---|---|---|
| 7,148,078 B2* | 12/2006 | Moyer | G06F 3/03543 | 257/E31.102 |
| 7,615,733 B2* | 11/2009 | Koay | G06F 3/0317 | 250/216 |
| 7,646,089 B2* | 1/2010 | Fukaya | H01L 23/3107 | 257/687 |
| 2004/0042232 A1* | 3/2004 | Huang | G06F 3/03545 | 362/560 |
| 2005/0093825 A1* | 5/2005 | Chang | G06F 3/03543 | 345/166 |
| 2005/0186710 A1 | 8/2005 | Moyer et al. | | |
| 2005/0285021 A1* | 12/2005 | Chiu | G06F 3/0317 | 250/216 |
| 2006/0256086 A1* | 11/2006 | Xie | G06F 3/03543 | 345/166 |
| 2007/0241451 A1* | 10/2007 | Koizumi | H01L 23/10 | 257/719 |
| 2008/0142679 A1* | 6/2008 | Grandjean | H01L 25/167 | 249/83 |
| 2009/0159780 A1* | 6/2009 | Koay | G06F 3/0317 | 250/206.1 |
| 2009/0267899 A1* | 10/2009 | Jeong | G06F 3/03543 | 345/166 |
| 2009/0283897 A1* | 11/2009 | Fukaya | H01L 23/3107 | 257/696 |
| 2014/0014824 A1* | 1/2014 | Huang | G01J 1/0271 | 250/216 |
| 2014/0333540 A1* | 11/2014 | Wang | G06F 3/03543 | 345/166 |
| 2014/0368433 A1* | 12/2014 | Chen | G06F 3/0317 | 345/166 |
| 2015/0261329 A1* | 9/2015 | Chang | G06F 3/03547 | 345/166 |
| 2015/0276472 A1* | 10/2015 | Wang | G01J 1/0233 | 250/216 |
| 2016/0161328 A1* | 6/2016 | Shen | G01S 7/4918 | 250/216 |

* cited by examiner

ELECTRONIC DEVICE WITH HIGH ELECTROSTATIC PROTECTION

RELATED APPLICATIONS

The present application is based on and claims priority to Taiwanese Application Number 103112243, filed Apr. 1, 2014, the disclosure of which is hereby incorporated by reference herein in its entirety.

BACKGROUND

1. Field of the Disclosure

This disclosure generally relates to an electronic device and, more particularly, to an electronic device capable of improving the electrostatic protection ability of the optoelectronic device and the utilization of the substrate area.

2. Description of the Related Art

Figure 1:
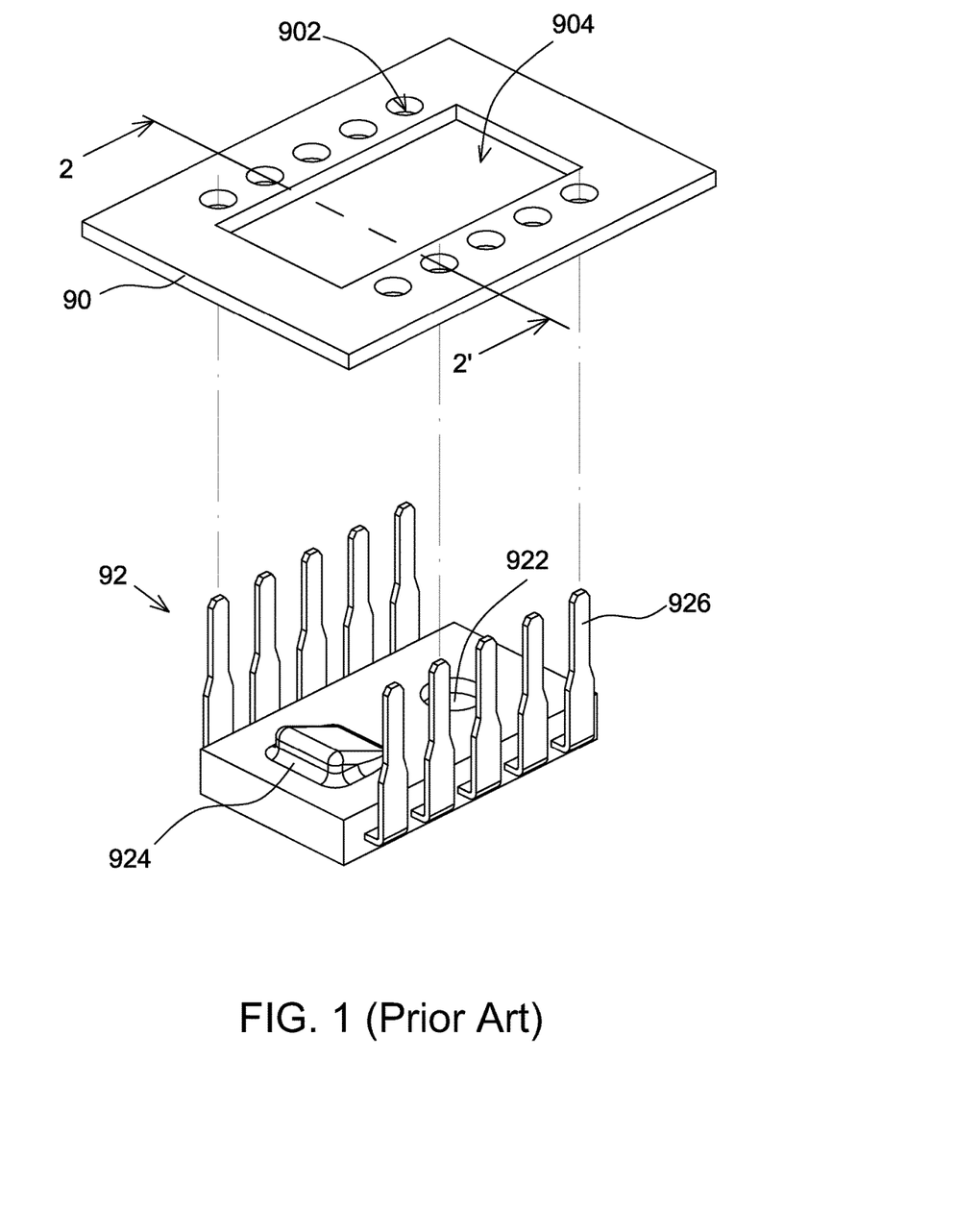
FIG. 1 is a schematic diagram of mounting an image sensor package on a circuit board conventionally.

The optical mouse generally includes an image sensor package which has the function of emitting light and sensing light. For example, FIG. 1 is a schematic diagram of an image sensor package 92 and a circuit board 90 included in a conventional optical mouse. The image sensor package 92 includes a light emitting diode 922, an image sensor 924 and a plurality of connecting pins 926. The circuit board 90 includes a plurality of metallized holes 902 and a circuit board opening 904, wherein the circuit board opening 904 is for the transmission of light therethrough. The image sensor package 92 is combined with the circuit board 90 by inserting the connecting pins 926 into the metallized holes 902 respectively.

When the optical mouse is put on a working surface, light emitted from the light emitting diode 922 passes through the circuit board opening 904 to illuminate the working surface, and the image sensor 924 receives reflected light from the working surface also through the circuit board opening 904.

In this structure, as the image sensor package 92 and the light emitting diode 922 send and receive signals via the connecting pins 926, the image sensor package 92 can be damaged when the electrostatic discharge (ESD) occurs on the connecting pins 926.

Figure 2:
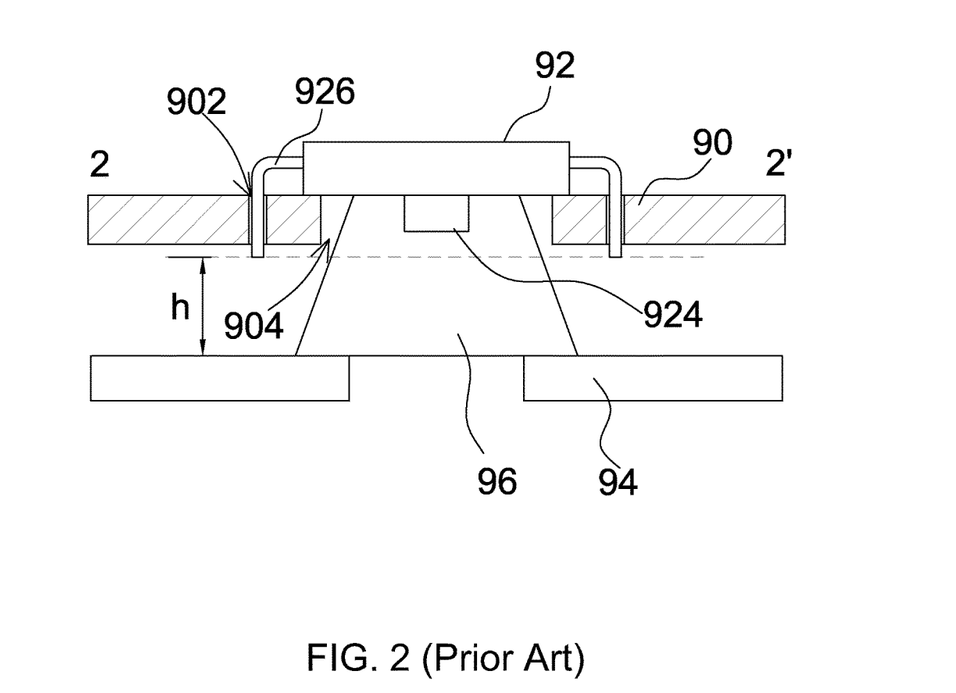
FIG. 2 is a cross-sectional view along line 2-2' of FIG. 1 and a housing.

For example, FIG. 2 is a cross-sectional view along line 2-2' of the image sensor package 92 of FIG. 1 as well as a housing 94. When the image sensor package 92 is mounted on the circuit board 90 and integrated in the optical mouse, in order to allow the image sensor package 92 to efficiently capture images, a lens 96 is disposed between the image sensor package 92 and the housing 94 such that free ends of the connecting pins 926 are separated from the housing 94 by a distance h. In order to decrease the influence of the electrostatic discharge, a large lens can be adopted so as to increase the distance h thereby increasing a discharge path. However, using a large lens can increase the manufacturing material of the lens thereby increasing the cost.

In addition, as the circuit board 90 has the circuit board opening 904, the electrical traces on the circuit board 90 can only be laid on the rest substrate surface such that the utilization of the substrate area is degraded.

SUMMARY

Accordingly, the present disclosure provides an electronic device capable of overcoming the drawbacks of the above conventional optical mouse.

The present disclosure provides an electronic device that may still increase a discharge path of the electrostatic discharge without adopting a large lens so as to improve the electrostatic protection.

The present disclosure further provides an electronic device in which a substrate opening on the substrate for the transmission of light therethrough is not necessary thereby improving the utilization of the substrate area.

The present disclosure provides an electronic device including a substrate and an optoelectronic device package. The optoelectronic device package includes an upper surface, a bottom surface and two lines of connecting pins. The upper surface is attached to the substrate. The bottom surface has a light source opening and a sensor opening. The connecting pins are bended toward the upper surface and electrically connected to the substrate.

The present disclosure further provides an electronic device including an outside plate, a substrate and an optoelectronic device package. The optoelectronic device package includes a bottom surface and a plurality of bended connecting pins. The bottom surface is opposite to the outside plate and has a light source opening and a sensor opening. The bended connecting pins are electrically connected to the substrate, wherein a distance from free ends of the bended connecting pins to the outside plate is larger than a distance from the bottom surface to the outside plate.

The present disclosure further provides an electronic device including a substrate and an optoelectronic device package. The substrate has a plurality of metallized holes. The optoelectronic device package includes a light source, an image sensor and a plurality of connecting pins. The light source is configured to emit light toward a direction of a bottom surface of the optoelectronic device package. The image sensor is configured to receive light from the direction of the bottom surface. The connecting pins are bended toward a direction opposite to the direction of the bottom surface and respectively inserted in the metallized holes.

In one aspect, the electronic device is a portable electronic device such as an optical mouse, a cell phone, a tablet computer or an optical distance measuring device.

In one aspect, a plurality of electrical traces are formed on a region of the substrate opposite to the optoelectronic device package, and the electrical traces may or may not directly electrically connected to the metallized holes.

In one aspect, the outside plate has at least one outside plate opening opposite to the light source opening and the sensor opening. The outside plate is, for example, a part of a housing of an optical mouse, a cell phone, a tablet computer or an optical distance measuring device.

In one aspect, the upper surface of the optoelectronic device package is adhered to the substrate through adhesive or only attached to the substrate.

In one aspect, the optoelectronic device package is a dual-in-line package.

In the electronic device according to some embodiments of the present disclosure, it is able to increase the discharge distance between electrical pins and the discharge surface by bending the electrical pins backward (an opposite direction of emitting and sensing light) so as to improve the electrostatic protection ability. In addition, as an opening is not necessary to be formed on the substrate opposite to the optoelectronic device package, the utilization of the substrate area is significantly improved. Meanwhile, as a large lens is not necessary to be adopted, the manufacturing material of the lens is reduced.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 3:
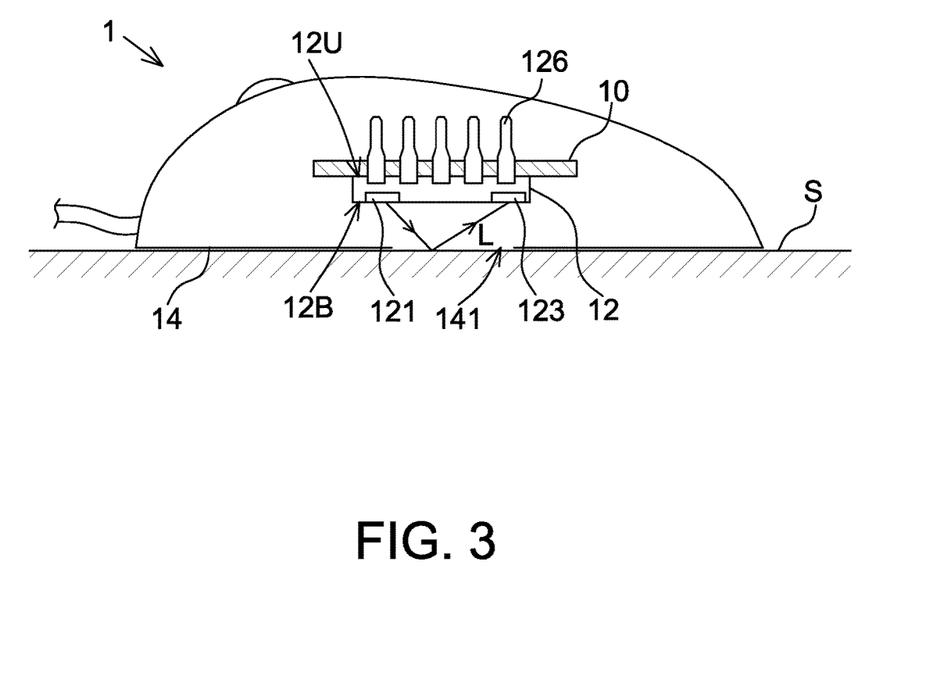
FIG. 3 is a schematic diagram of an electronic device according to one embodiment of the present disclosure.

Referring to FIG. 3, it is a schematic diagram of the electronic device 1 according to one embodiment of the present disclosure. It should be mentioned that although an optical mouse is shown herein, it is not to limit the present disclosure and the electronic device 1 may be, for example, a portable electronic device such as a cell phone, a tablet computer or an optical navigation device. The electronic device 1 includes a light source configured to illuminate a reflective surface and an image sensor configured to receive reflected light from the reflective surface. For example, when the electronic device 1 is an optical mouse, the reflective surface is, for example, a working surface S (as shown in FIG. 3). When the electronic device 1 is other portable devices such as a proximity sensor, the electronic device 1 is configured to detect the distance of an approaching object and thus the reflective surface is, for example, a finger surface or the surface of other objects.

Figure 4:
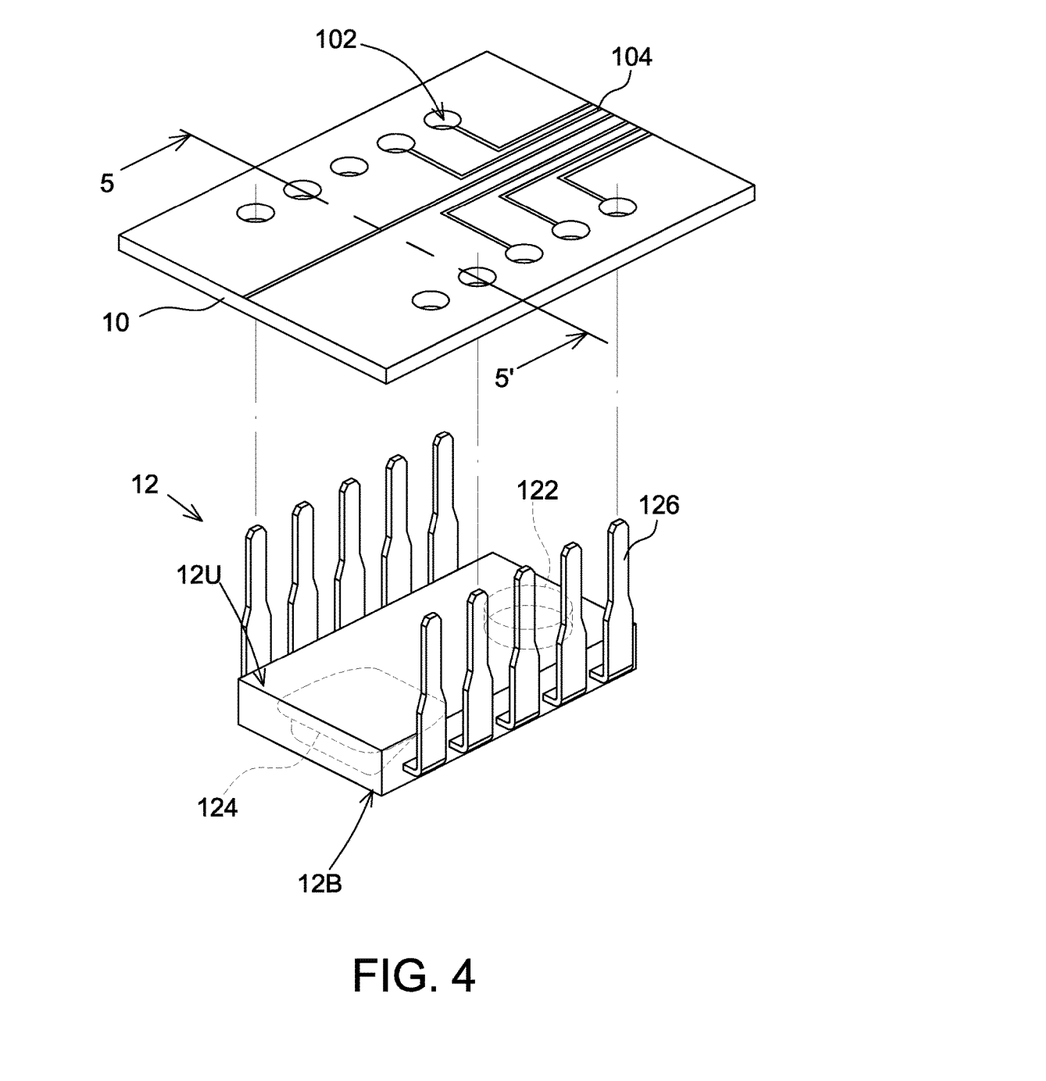
FIG. 4 is a schematic diagram of mounting an optoelectronic device package on a substrate according to one embodiment of the present disclosure.

Referring to FIGS. 3 and 4 together, the electronic device 1 includes a substrate 10 and an optoelectronic device package 12, wherein the substrate 10 is, for example, a printed circuit board (PCB) or a flexible board, and the optoelectronic device package 12 is, for example, an image sensor package and is a dual-in-line package. It is appreciated that there are other electronic devices and electrical traces further disposed on the substrate 10. The method of securing the substrate 10 and the optoelectronic device package 12 in the electronic device 1 is not an object of the present disclosure, and thus details thereof are not described herein.

The substrate 10 includes a plurality of metallized holes 102 and electrical traces 104 electrically connected to the metallized holes 102. In this embodiment, as a region on the substrate 10 opposite to the optoelectronic device package 12 dose not have an opening, electrical traces 104 are laid on said region to electrically connect to the metallized holes 102 so as to effectively improve the surface utilization rate of the substrate 10. It should be mentioned that the connection and layout of the electrical traces shown in FIG. 4 are only intended to illustrate but not to limit the present disclosure. For example, the electrical traces 104 passing through the region opposite to the upper surface of the optoelectronic device package 12 are not necessary to electrically connect to the metallized holes 102 but only pass through said region. It is appreciated that the arrangement of the metallized holes 102 corresponds to the arrangement of connecting pins of the package structure to be combined and is not limited to that shown in FIG. 4.

The optoelectronic device package 12 has an upper surface 12U and a bottom surface 12B opposite to the upper surface 12U, and the optoelectronic device package 12 may be a cube or a rectangular parallelepiped without particular limitation. The upper surface 12U is attached to a surface of the substrate 10 (e.g. the bottom surface of the substrate in FIG. 4), and the upper surface 12U is, for example, adhered to the substrate 10 through adhesive. The bottom surface 12B is formed with a light source opening 121 and a sensor opening 123. It should be mentioned that shapes and positions of the light source opening 121 and the sensor opening 123 shown in FIG. 3 are only intended to illustrate but not to limit the present disclosure.

The optoelectronic device package 12 includes a light source 122 and an image sensor 233 therein to electrically connect to an external circuit of the optoelectronic device package 12 via a plurality of connecting pins 126. The light source 122 and the image sensor 124 are respectively disposed inside of the light source opening 121 and the sensor opening 123. The light source 122 is, for example, a light emitting diode or a laser diode, and configured to emit light of a predetermined spectrum such as red light, infrared light or UV light. The image sensor 124 is, for example, a CCD image sensor, a CMOS image sensor or other light sensing devices, and is configured to output detected data only or output detected data being post-processed according to its application without particular limitation.

The light source 122 is configured to emit light toward a front of a direction of a bottom surface 12B through the light source opening 121. The image sensor 124 is configured to receive light from the front of the direction of the bottom surface 12B through the sensor opening 123, e.g. reflected light from a working surface or a finger surface. The connecting pins 126 extend out from the lateral of the optoelectronic device package 12 and are preferably located at two opposite sides of the optoelectronic device package 12 so as to form a dual-in-line package having two lines of connecting pins. The connecting pins 126 are electrically connected to the light source 122 and the image sensor 124 configured to transmit control signals to the light source 122 and transmit outputted signals from the image sensor 124. In other embodiments, the connecting pins 126 may be arranged at four surfaces other than the upper surface 12U and the bottom surface 12B of the optoelectronic device package 12 according to the application thereof.

In this embodiment, the connecting pins 126 extend out from an encapsulation body of the optoelectronic device package 12 and are bended toward the upper surface 12U configured to be respectively inserted into the metallized holes 102 thereby electrically connecting to the substrate 10, e.g. using the soldering to electrically connect and fix the connecting pins 126 in the metallized holes 102. In one embodiment, if the optoelectronic device package 12 is mounted on the substrate 10 by soldering the connecting pins 126 and the metallized holes 102, the upper surface 12U of the optoelectronic device package 12 may only be attached to a surface of the substrate 10 (e.g. the bottom surface of the substrate in FIG. 4) without using the adhesive.

Figure 5:
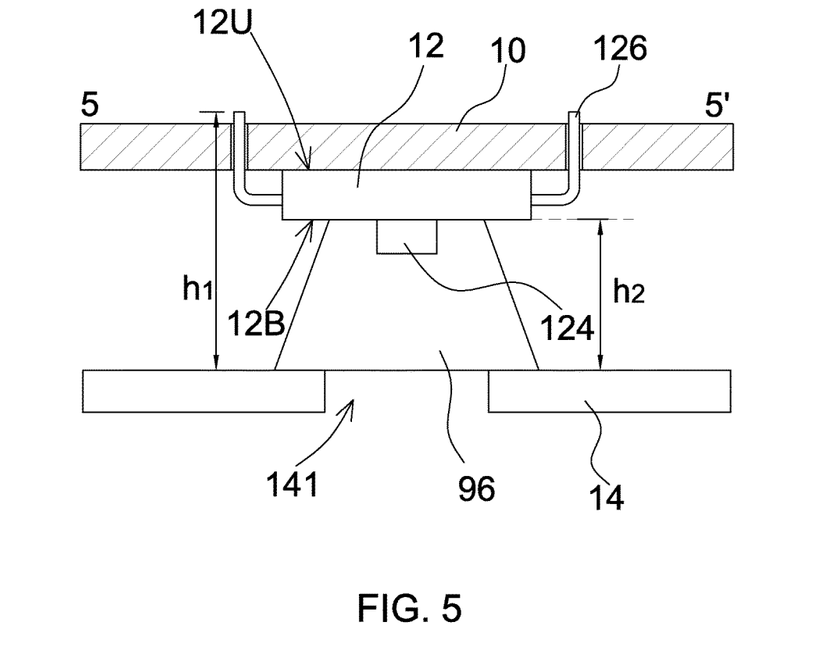
FIG. 5 is cross-sectional view along line 5-5' of FIG. 4 and an outside plate.

Referring to FIG. 5, it is a cross-sectional view along line 5-5' of FIG. 4 as well as an outside plate 14. When the substrate 10 and the optoelectronic device package 12 secured on the substrate 10 are disposed inside of an electronic device 1, the bottom surface 12B of the optoelectronic device package 12 is opposite to an outside plate 14 of the electronic device 1, wherein the outside plate 14 is, for example, a part of a housing of an optical mouse, a cell phone, a tablet computer or an optical distance measuring device. As the connecting pins 126 are bended toward an opposite direction of the direction of the bottom surface (i.e. bended toward the upper surface 12U) and electrically connected to the substrate 10, a distance h1 from free ends of the bended connecting pins 126 to the outside plate 14 is larger than a distance h2 from the bottom surface 12B to the outside plate 14. Accordingly, compared to the conventional arrangement shown in FIG. 2, if the same lens 96 is adopted, the distance from the connecting pins 126 to the outside plate 14 is increased (i.e. h1, h2>h) such that a discharge path of the electrostatic discharge is effectively increased so as to improve the electrostatic protection ability. By using the arrangement of the present disclosure, a large lens 96 is not necessary to be used so as to save the material of manufacturing the lens as well.

For normal operation of the optoelectronic device package 12, the outside plate 14 has at least one outside plate opening 141 opposite to the light source opening 121 and the sensor opening 123. For example, a single outside plate opening 141 may be formed on the outside plate 14 to opposite to the light source opening 121 and the sensor opening 123 at the same time, or two outside plate openings are formed to respectively opposite to the light source opening 121 and the sensor opening 123. Accordingly, the light source 122 emits light toward a front of the bottom surface 12B sequentially through the light source opening 121 and the outside plate opening 141. For example, when the electronic device 1 is an optical mouse, the light source 122 is configured to illuminate a working surface S; whereas when the electronic device 1 is an optical distance measuring device, the light source 122 is configured to illuminate an object surface of an object in front of the outside plate opening 141. The image sensor 124 is configured to receive reflected light from the working surface S or the object surface and sequentially passing through the outside plate opening 141 and the sensor opening 123, and image sensor 124 then outputs detected signals being pre-processed or post-processed.

In other words, in the arrangement of the present disclosure, the light source 122 is configured to illuminate a reflective surface and the image sensor 124 is configured to receive reflected light from the reflective surface. A distance from the bottom surface 12B of the optoelectronic device package 12 to the reflective surface is smaller than a distance from free ends of the connecting pins to the reflective surface so as to increase a discharge path of the electrostatic discharge thereby improving the electrostatic protection ability.

In another embodiment, the substrate 10 may also have a substrate opening for accommodating the optoelectronic device package 12 therein, and the connecting pins 126 are also bended toward an opposite direction of the light emitting and receiving surface of the optoelectronic device package 12 so as to further increase the distance between the connecting pins 126 and the outside plate 14.

Figure 6:
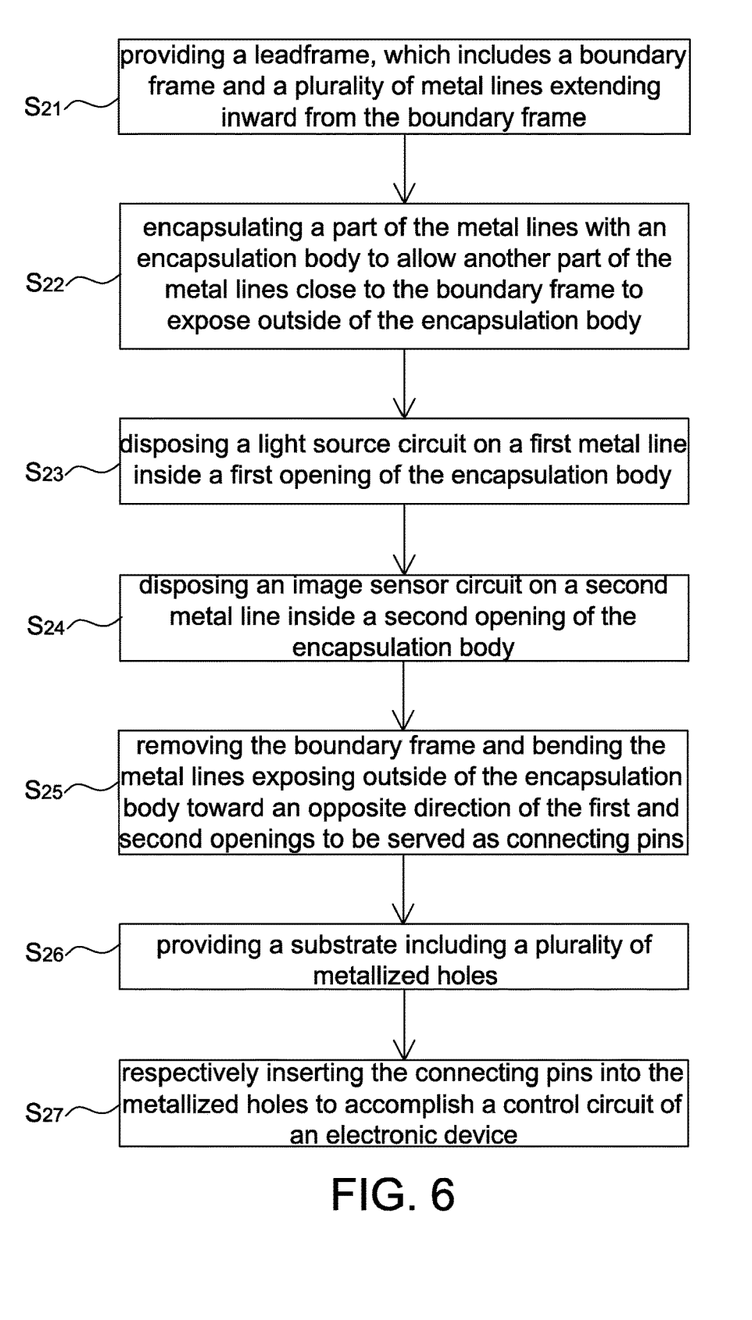
FIG. 6 is a flow chart of a manufacturing method of a control circuit of an electronic device according to one embodiment of the present disclosure.

Referring to FIG. 6, it is a flow chart of a manufacturing method of a control circuit of an electronic device according to one embodiment of the present disclosure, which includes the steps of: providing a leadframe, which includes a boundary frame and a plurality of metal lines extending inward from the boundary frame (Step $S_{21}$); encapsulating a part of the metal lines with an encapsulation body to allow another part of the metal lines close to the boundary frame to expose outside of the encapsulation body, wherein the encapsulation body includes a first opening and a second opening respectively expose a part of the metal lines (Step $S_{22}$); disposing a light source circuit on a first metal line inside the first opening (Step $S_{23}$); disposing an image sensor circuit on a second metal line inside the second opening (Step $S_{24}$); removing the boundary frame and bending the metal lines exposing outside of the encapsulation body toward an opposite direction of the first opening and the second opening to be served as a plurality of connecting pins 126, as shown in FIG. 4 (Step $S_{25}$); providing a substrate 10 including a plurality of metallized holes 102, as shown in FIG. 4 (Step $S_{26}$); and respectively inserting the connecting pins 126 into the metallized holes 102 to accomplish a control circuit of an electronic device, as shown in FIG. 3 (Step $S_{27}$), wherein the first opening may be served as the above light source opening 121 and the second opening may be served as the above sensor opening 123. Preferably, the connecting pins 126 are symmetrically arranged at two opposite sides of the encapsulation body so as to form a dual-in-line package. Said encapsulation body may be made of opaque plastic resin. In the Steps $S_{23}$ and $S_{24}$, in disposing the light source circuit and the image sensor circuit, the wire bonding may be used to connect the light source circuit and the image sensor circuit to parts of the metal lines.

It should be mentioned that in order to clearly show every element, the size and position relationship of every element in the drawings of the present disclosure are only intended to illustrate but not to limit the present disclosure.

In one embodiment, in order to prevent the dust and pollutant from entering the optoelectronic device package 12, the light source opening 121 and the sensor opening 123 may optionally sealed by a transparent cover respectively, wherein said transparent is referred to that it is transparent to the light emitted from the light source 122. Or the cover may include a filter film to allow the light emitted only from the light source 122 to pass through.

As mentioned above, the conventional optical mouse has to adopt a large lens in order to increase a discharge path of the electrostatic discharge and has a circuit board opening thereby decreasing the utilization rate of the substrate surface. Therefore, the present disclosure further provides an electronic device (FIGS. 3 to 5) in which the connecting pins are bended toward a backward direction so as to increase a discharge path of the electrostatic discharge such that the lens size needs not to be increased. In addition, an opening for the transmission of light is not necessary to be formed on the substrate such that the utilization of the substrate area is increased as well.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:
1. An electronic device, comprising:
  a substrate;
  an optoelectronic device package, comprising:
    an upper surface attached to the substrate;
    a bottom surface comprising a light source opening and a sensor opening;
    two opposite sides connecting the upper surface and the bottom surface;
    an image sensor configured to receive light from a front of the bottom surface through the sensor opening; and two lines of connecting pins extending out from said two opposite sides, respectively, said connecting pins being
bended toward the upper surface, and
electrically connected to the substrate; and
an outside plate having an outside plate opening opposite to the light source opening and the sensor opening,
wherein electrical traces are formed on a region of the substrate opposite to the upper surface of the optoelectronic device package.

2. The electronic device as claimed in claim 1, wherein the optoelectronic device package further comprises:
a light source configured to emit light toward the front of the bottom surface through the light source opening.

3. The electronic device as claimed in claim 2, wherein the light source is configured to illuminate a reflective surface and the image sensor is configured to receive reflected light from the reflective surface, and a distance from the bottom surface to the reflective surface is smaller than a distance from free ends of the connecting pins to the reflective surface.

4. The electronic device as claimed in claim 1, wherein the upper surface of the optoelectronic device package is adhered to the region of the substrate opposite to the upper surface of the optoelectronic device package through adhesive.

5. The electronic device as claimed in claim 1, wherein the electronic device is an optical mouse, a cell phone, a tablet computer or an optical distance measuring device.

6. An electronic device, comprising:
an outside plate;
a substrate; and
an optoelectronic device package, comprising:
a bottom surface opposite to the outside plate and comprising a light source opening and a sensor opening;
an upper surface opposite to the bottom surface;
an image sensor configured to receive reflected light through the sensor opening; and
a plurality of bended connecting pins having bent portions bending toward the upper surface, and electrically connected to the substrate, wherein a distance from free ends of the bended connecting pins to the outside plate is larger than a distance from the bent portions to the outside plate,
wherein electrical traces are formed on a region of the substrate opposite to the optoelectronic device package.

7. The electronic device as claimed in claim 6, wherein the optoelectronic device package further comprises:
a light source configured to emit light through the light source opening.

8. The electronic device as claimed in claim 6, wherein the outside plate comprises at least one outside plate opening opposite to the light source opening and the sensor opening.

9. The electronic device as claimed in claim 6, wherein the optoelectronic device package is adhered to the region of the substrate opposite to the optoelectronic device package through adhesive.

10. The electronic device as claimed in claim 6, wherein the electronic device is an optical mouse, a cell phone, a tablet computer or an optical distance measuring device.

11. An electronic device, comprising:
a substrate comprising a plurality of metallized holes; and
an optoelectronic device package, comprising:
a light source configured to emit light toward a direction of a bottom surface of the optoelectronic device package;
an image sensor configured to receive light from the direction of the bottom surface; and
a plurality of connecting pins bended toward a direction opposite to the direction of the bottom surface to have bent portions bending toward the direction opposite to the bottom surface, and respectively inserted in the metallized holes, and
an outside plate having at least one outside plate opening opposite to the light source and the image sensor,
wherein electrical traces are formed on a region of the substrate opposite to the optoelectronic device package.

12. The electronic device as claimed in claim 11, wherein the electrical traces are electrically connected to the metallized holes.

13. The electronic device as claimed in claim 11, wherein the light source is configured to illuminate a reflective surface and the image sensor is configured to receive reflected light from the reflective surface, and a distance from the bottom surface of the optoelectronic device package to the reflective surface is smaller than a distance from free ends of the connecting pins to the reflective surface.

14. The electronic device as claimed in claim 11, wherein the electronic device is an optical mouse, a cell phone, a tablet computer or an optical distance measuring device.

15. The electronic device as claimed in claim 1, wherein the substrate has an upper surface and a bottom surface,
the substrate is arranged above the optoelectronic device package, with the bottom surface of the substrate facing the upper surface of the optoelectronic device package, and
the electrical traces are on the upper surface of the substrate, and are electrically connected to the connecting pins of the optoelectronic device package.

16. The electronic device as claimed in claim 15, wherein the substrate further has metallized holes extending between the upper surface of the substrate and the bottom surface of the substrate,
the electrical traces are respectively electrically connected to the metallized holes, and
the connecting pins are respectively inserted in the metallized holes to be electrically connected to the electrical traces.

17. The electronic device as claimed in claim 16, wherein the metallized holes are arranged in two rows respectively on opposite sides of a middle region of the upper surface of the substrate, and
the electrical traces are arranged in the middle region of the upper surface of the substrate, between the two rows of the metallized holes.

18. The electronic device as claimed in claim 6, wherein the substrate has an upper surface and a bottom surface,
the substrate is arranged above the optoelectronic device package, with the bottom surface of the substrate facing the upper surface of the optoelectronic device package, and
the electrical traces are on the upper surface of the substrate, and are electrically connected to the connecting pins of the optoelectronic device package.

19. The electronic device as claimed in claim 18, wherein the substrate further has metallized holes extending between the upper surface of the substrate and the bottom surface of the substrate,
the electrical traces are respectively electrically connected to the metallized holes,
the connecting pins are respectively inserted in the metallized holes to be electrically connected to the electrical traces, the metallized holes are arranged in two rows respectively on opposite sides of a middle region of the upper surface of the substrate, and the electrical traces are arranged in the middle region of the upper surface of the substrate, between the two rows of the metallized holes.

20. The electronic device as claimed in claim 19, wherein the upper surface of the optoelectronic device package is adhered to the bottom surface of the substrate through adhesive.

* * * * *